(12) United States Patent
Sun et al.

(10) Patent No.: US 11,131,591 B2
(45) Date of Patent: Sep. 28, 2021

(54) FBG SENSOR-BASED BOLT FASTENING JOINT SURFACE PRESSURE DETECTION METHOD

(71) Applicant: DALIAN UNIVERSITY OF TECHNOLOGY, Dalian (CN)

(72) Inventors: Qingchao Sun, Dalian (CN); Xiaodong Li, Dalian (CN); Qingyuan Lin, Dalian (CN); Xiaokai Mu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 246 days.

(21) Appl. No.: 16/603,516

(22) PCT Filed: Aug. 22, 2018

(86) PCT No.: PCT/CN2018/101644
§ 371 (c)(1),
(2) Date: Oct. 7, 2019

(87) PCT Pub. No.: WO2020/024340
PCT Pub. Date: Feb. 6, 2020

(65) Prior Publication Data
US 2020/0284669 A1    Sep. 10, 2020

(30) Foreign Application Priority Data

Aug. 2, 2018 (CN) .......................... 201810867295.0

(51) Int. Cl.
 *G01L 1/24* (2006.01)
 *G01L 5/00* (2006.01)
 *G01L 25/00* (2006.01)

(52) U.S. Cl.
 CPC ............... *G01L 1/246* (2013.01); *G01L 5/00* (2013.01); *G01L 25/00* (2013.01)

(58) Field of Classification Search
None
See application file for complete search history.

(56) References Cited

U.S. PATENT DOCUMENTS 6,496,264 B1 * 12/2002 Goldner ................. G01H 9/004
                                                       356/478
9,188,256 B2 * 11/2015 Kristiansen ........ G01K 11/3206
9,429,485 B1 *  8/2016 Cavallaro ................. G01L 1/16

FOREIGN PATENT DOCUMENTS

CN         101283384 A      10/2008
CN         104033457 A       9/2014
(Continued)

*Primary Examiner* — Roy Y Yi
(74) *Attorney, Agent, or Firm* — Muncy, Geissler, Olds & Lowe, P.C.

(57) ABSTRACT

The present invention belongs to the technical field of joint surface pressure detection of connecting pieces, and provides an FBG sensor-based bolt fastening joint surface pressure detection method, comprising the steps of determining the size and the position of an FBG sensor; and determining the pressure of a joint surface measuring position on the basis of the single bolt connection joint surface pressure distribution theory, and completing calibration in real-time correspondence to the strain and pressure values to realize precise detection of the joint surface pressure. Determining the size and the position of the FBG sensor embedding slot according to the above method can ensure the reliability and accuracy of strain information; and an accurate strain-joint surface pressure curve can be obtained in combination with the determination of the joint surface pressure, which provides a practical and feasible method for the research on the bolt connection joint surface pressure.

1 Claim, 2 Drawing Sheets

(56) References Cited

FOREIGN PATENT DOCUMENTS

| CN | 107014530 A | 8/2017 |
|----|-------------|--------|
| CN | 206943194 U | 1/2018 |
| JP | 2016-003895 A | 1/2016 |
| TW | 201606206 A | 2/2016 |

\* cited by examiner

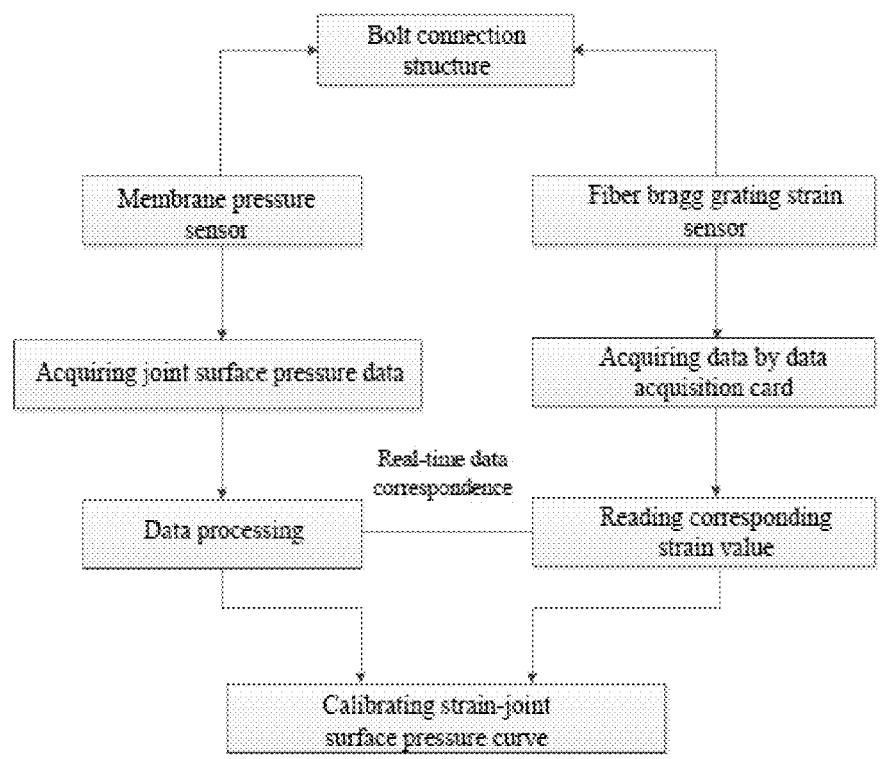
Fig. 1 (Fig.1 as an illustration in Abstract)
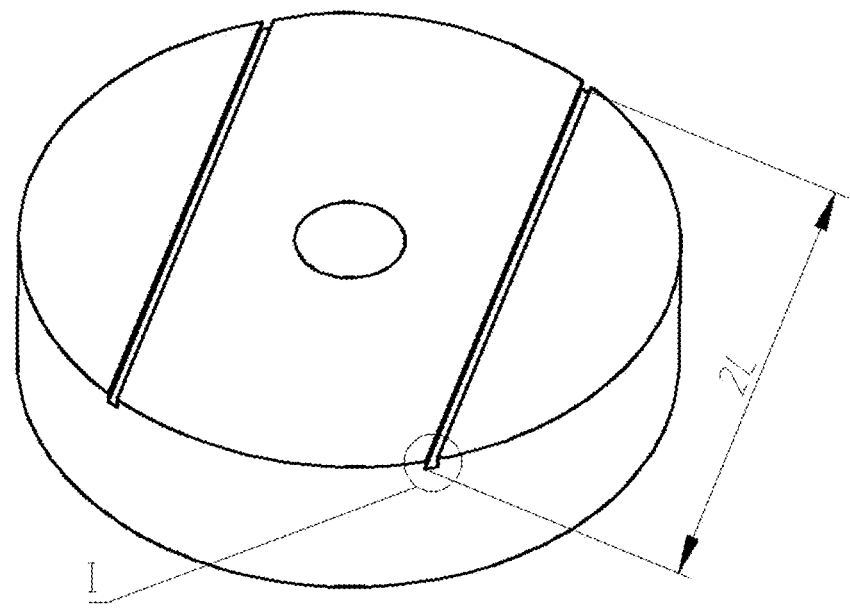
Fig. 2

FBG SENSOR-BASED BOLT FASTENING JOINT SURFACE PRESSURE DETECTION METHOD

TECHNICAL FIELD

The present invention belongs to the technical field of joint surface pressure detection of connecting pieces, and particularly relates to a method of indirectly reflecting the joint surface pressure by detecting the joint surface strain by an FBG sensor.

BACKGROUND

Bolt connection is frequently used in the assembly of components and parts of major equipment and the assembly of high-precision parts in engineering, but it has been difficult to precisely control bolt preload and connection joint surface pressure, and inaccurate control on joint surface pressure and non-uniform distribution of the joint surface pressure after installation both have serious impacts on the connection stiffness and the overall performance of the equipment. In the assembly of major equipment, a large number of bolt connections exist in parts such as high-pressure and low-pressure turbine shafts and disc drums of high-pressure compressors in aero-engine, and precise control on joint surface pressure and distribution uniformity can effectively improve the performance of the equipment. Therefore, in the assembly of the major equipment, it is particularly important to obtain a detection method of joint surface pressure which is accurate and reliable in measurement and can be used in practice.

With the development and increasing refinement of high-end equipment, it is especially urgent to accurately detect joint surface parameters, which requires not only mastering the pressure distribution rule but also realizing precise detection of pressure. At present, the ultrasonic testing and the thin film method have been used in combination with the bolt connection theory model to detect and analyze the joint surface pressure in bolt connection. The ultrasonic testing can realize direct nondestructive testing of parameters including joint surface contact area and pressure distribution, but is susceptible to noise and other factors, and the application thereof is severely limited due to low detection precision. The thin film sensor method can be used to detect the joint surface pressure in real time, but is difficult to apply to the actual situation, and the thin film sensor cannot be taken out, which may have an impact on connection and cause failure to perform calibration. The above methods have limitations in their respective applications.

In view of the defects of the above detection means, the present invention provides a new and reliable joint surface pressure detection method. Because the ultrasonic testing is susceptible to external factors and thus has low detection precision, but the external factors such as noise have a small impact on the detection of the FBG sensor, and the method of the present invention directly detects the magnitude of strain capacity and thus has higher precision, the detection precision is improved greatly. After the calibration is performed by the method of the present invention, the specific value of the joint surface pressure can be effectively detected with minimal damage to the joint surface, which avoids the defects of embedding a pressure sensor in the joint surface. Therefore, the method of the present invention has strong practical value.

SUMMARY

Under the background of increasing demand for the assembly precision of various major equipment and precision equipment, and in combination with the analysis of the defects and deficiencies of the existing joint surface parameter detection methods, the present invention provides an FBG sensor-based bolt fastening joint surface pressure detection method, which uses a pressure sensor to detect the joint surface pressure while detecting the strain capacity of connected pieces by an embedded FBG sensor. The two sensors are used simultaneously to obtain strain and real-time data corresponding to the surface pressure of the joint surface measuring position in real time from two perspectives of measurement. On the basis of the strain transfer theory of the embedded FBG sensor and the single bolt connection joint surface pressure distribution theory, a strain joint surface pressure relation curve is calibrated. The connection joint surface is in a closed form, so parameters such as joint surface pressure are difficult to detect directly. The method provided by the present invention can effectively detect the joint surface pressure value without affecting the connection of the joint surface and improve the measurement precision, and is more suitable for research and application.

The technical solution of the present invention is:

An FBG sensor-based bolt fastening joint surface pressure detection method, which converts the joint surface pressure to the strain of the FBG sensor, comprising the steps of determining the size and the position of an FBG sensor embedding slot on the basis of the strain transfer theory of an embedded FBG sensor; and determining the pressure of a joint surface measuring position on the basis of the single bolt connection joint surface pressure distribution theory, and completing calibration in real-time correspondence to the strain and pressure values to realize precise detection of the joint surface pressure, wherein the specific design method is as follows:

(1) Determination of size of FBG sensor embedding slot

According to the average strain transmissibility of the FBG sensor and in combination with the actual fiber packaging technology and processing technology, finally determining the size of the FBG sensor embedding slot;

The average strain transmissibility of the FBG sensor is:

$$\alpha = \frac{\overline{\varepsilon_g(x)}}{\varepsilon_m} = \frac{2\int_0^L \varepsilon_g(x)d_x}{2L\varepsilon_m} = 1 - \frac{\sinh(kL)}{kL\cosh(kL)} \quad (1)$$

$$k^2 = \frac{DG_c}{\pi \cdot r_g^2 E_g(r_m - r_g)} \quad (2)$$

where, D is the width of the embedding slot, H is the height of the embedding slot, and H=D; $G_c$ is the shear modulus of colloid; $r_g$ is the radius of bare fiber; $E_g$ is the elastic modulus of fiber; $r_m - r_g$ is the thickness of colloid between fiber and matrix; and L is half of the adherence length of the FBG sensor;

When the adherence length of the FBG sensor is constant, the influence factor of a parameter k determines the average strain transmissibility of the FBG sensor, the parameter is determined with a approaching $\overline{\alpha}$ as the goal, and the size of the FBG sensor embedding slot is determined on the premises of actual processing precision and fiber packaging technology;

(2) Determination of Position of FBG Sensor Embedding Slot

Determining the position of the FBG sensor embedding slot according to the critical adherence length of the FBG sensor and the single bolt connection joint surface pressure distribution theory, wherein the length of the FBG sensor embedding slot arranged in the selected position must reach the critical adherence length of the FBG sensor; according to the single bolt connection joint surface pressure distribution theory, the pressure on the joint surface along the radial direction of connected pieces meets the quartic curve distribution, and the joint surface pressure on the FBG sensor embedding slot is destroyed, but to ensure the integrity of quartic curve distribution information, the position of the FBG sensor embedding slot is restricted in combination with the critical adherence length of the FBG sensor and the single bolt connection joint surface pressure distribution theory;

The critical adherence length (CAL) of the FBG sensor is:

$$CAL = l_c = 9.24/k \qquad (3)$$

According to formula (3), calculating the critical adherence length of the FBG sensor, and determining the position of the FBG sensor embedding slot in combination with the requirements of the single bolt connection joint surface pressure distribution theory;

According to the determined size and position of the FBG sensor embedding slot, packaging the FBG sensor, thus obtaining the strain value of the bolt fastening joint surface;

(3) Determination of joint surface contact pressure of FBG sensor measuring position On the basis of the single bolt connection joint surface pressure distribution theory, the joint surface contact pressure meets the quartic curve distribution along the radial direction, as shown in the following formula:

$$p_n(r) = c_4 r^4 + c_3 r^3 + c_2 r^2 + c_1 r + c_0 \qquad (4)$$

where, $c_i$ (i=0, 1, . . . , 4) is an unknown parameter; and r is the distance from any point on the radius to the center of the bolt.

Extracting the radial pressure value of the connected pieces to fit a quartic curve. Note that when "bad points" at the embedding slot are abandoned, 2-3 peripheral points can be abandoned to avoid interference with the curve information and ensure the correctness and integrity of the pressure distribution information contained in the quartic curve. After fitting the curve, selecting a position point at the embedding slot, thus obtaining the joint surface pressure value of the point.

The present invention has the following beneficial effect that: an FBG sensor-based bolt fastening joint surface pressure detection method is an accurate and reliable joint surface pressure detection method and solves the difficult problem that a closed joint surface cannot be detected directly. Determining the size and the position of the FBG sensor embedding slot according to the above method can ensure the reliability and accuracy of strain information. An accurate strain joint surface pressure curve can be obtained in combination with the determination of the joint surface pressure, which provides a practical and feasible method for the research on the bolt connection joint surface pressure.

DESCRIPTION OF DRAWINGS

FIG. 1 is a block diagram of the design principle of the present invention;

FIG. 2 a stereographic structural diagram of a connected piece with an FBG sensor embedding slot;

Figure 3:
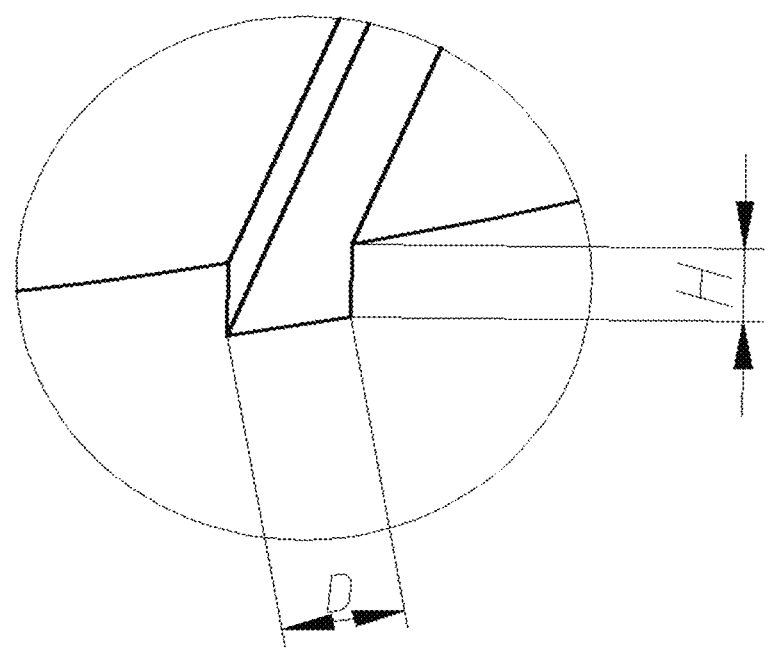
FIG. 3 is an enlarged view of I.

In the figures, L is half of the adherence length of the FBG sensor; D is the width of an FBG sensor embedding slot; and H is the height of an FBG sensor embedding slot.

DETAILED DESCRIPTION

The technical solution of the present invention is further described below in detail in combination with the drawings and the specific embodiment which is described to only explain the present invention but not to limit the present invention.

The design principle of the present invention is shown in FIG. 1. On the basis of the characteristics of fiber bragg grating and the principle of the FBG sensor, an FBG sensor is embedded in a connected piece: a reasonable embedding slot is arranged on the surface of the connected piece, and the FBG sensor is embedded in the connected piece according to the fiber bragg grating packaging technology to measure the strain value of the connection joint surface; meanwhile, a membrane pressure sensor is arranged between the connected pieces to measure the pressure value of the bolt connection joint surface; the two sensors feed back strain joint surface pressure data under different preloads in real time, and the calibration test is completed, thus obtaining a strain joint surface pressure curve graph; the addition of the membrane pressure sensor is not allowed in bolt connection under actual conditions, so the pressure on the bolt connection joint surface can be studied according to the calibrated result curve; the strain value on one FBG sensor is read in application, and a surface pressure value accurately corresponding to the strain value can be found on the curve. The present invention provides a practical and feasible method for the research on the bolt connection joint surface pressure.

In the embodiment, specific parameters are shown in Table 1 below:

TABLE 1

| | Parameters and Corresponding Values | | | | |
|---|---|---|---|---|---|
| Parameter | Elastic Modulus of Fiber/Eg | Shear Modulus of Colloid/Gc | Width of Fiber Embedding Slot/D | Radius of Bare Fiber/rg | Thickness of Colloid between Fiber and Matrix/($r_m - r_g$) |
| Value | 72 GPa | 15 MPa | 1 mm | 62.5 μm | 437.5 μm |

The specific steps are as follows:

(1) Determination of Size of FBG Sensor Embedding Slot

Analyzing the average strain transmissibility of the FBG sensor, the fiber packaging technology and the actual processing technology to determine the reasonable size of the embedding slot. When the adherence length of the FBG sensor reaches a certain value, sin h(kx) and cos h(kx) are similar, the influence factor of a parameter k determines the average strain transmissibility, the parameter is determined with $\bar{\alpha}$ approaching 1 as the goal, and the appropriate size of the FBG sensor embedding slot is determined by the test on the premises of actual processing precision and packaging technology: the section of the embedding slot is a 1*1 mm square slot.

(2) Determination of Position of FBG Sensor Embedding Slot

Determining the position of the embedding slot according to the critical adherence length of the FBG sensor and the requirements of the single bolt connection joint surface pressure distribution theory.

Substituting the above experimental parameters and obtaining by calculation:

$$CAL=l_c=9.24/k=46.9 \text{ mm}$$

Determining the appropriate adherence position of the sensor to be the midpoint of the radius of the annular connected piece according to the above calculation result in combination with the fitting requirement of the radial surface pressure distribution curve of the connected piece.

(3) Determination of Joint Surface Pressure of FBG Sensor Measuring Position

Extracting the positive stress value of a full radius on the joint surface along the radius direction, removing 2-3 "bad points" at the embedding slot, and conducting quartic polynomial curve fitting according to $p_n(r)=c_4r^4+c_3r^3+c_2r^2+c_1r+c_0$. Selecting the specific position of the embedding slot for the experiment, thus reading the specific joint surface pressure value in the fitting curve.

Figure 4:
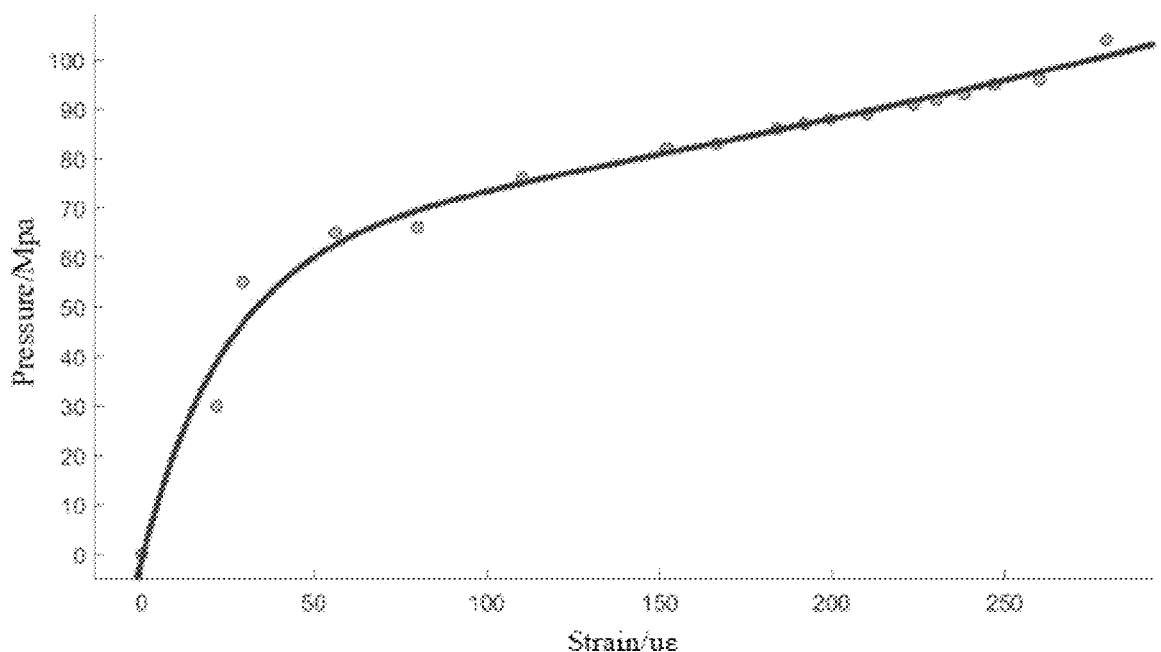
FIG. 4 is a strain joint surface pressure curve graph obtained through calibration.

The preload magnitude of the bolt is changed, the strain value on the FBG sensor is read accordingly, meanwhile the joint surface pressure value of the measuring position is obtained by analysis, and if the two values are in real-time correspondence, a strain-joint surface pressure curve is obtained, as shown in FIG. 4. The addition of the membrane pressure sensor is not allowed in bolt connection under actual conditions, so according to the calibrated result curve, the strain value on one FBG sensor is read in application, and a surface pressure value accurately corresponding to the strain value can be found on the curve. The present invention provides a practical and feasible method for the research on the bolt connection joint surface pressure.

The invention claimed is:

1. An FBG sensor-based bolt fastening joint surface pressure detection method, which converts the bolt fastening joint surface pressure to the strain of the FBG sensor, comprising the steps of determining the size and the position of an FBG sensor embedding slot on the basis of the strain transfer theory of an embedded FBG sensor; and determining the pressure of a joint surface measuring position on the basis of the single bolt connection joint surface pressure distribution theory, and completing calibration in real-time correspondence to the strain and pressure values to realize precise detection of the joint surface pressure, wherein the specific design method is as follows:

(1) determination of size of FBG sensor embedding slot according to the average strain transmissibility of the FBG sensor and in combination with the actual fiber packaging technology and processing technology, finally determining the size of the FBG sensor embedding slot;

the average strain transmissibility of the FBG sensor is:

$$\overline{\alpha} = \frac{\overline{\varepsilon_g(x)}}{\varepsilon_m} = \frac{2\int_0^L \varepsilon_g(x)d_x}{2L\varepsilon_m} = 1 - \frac{\sinh(kL)}{kL\cosh(kL)} \quad (1)$$

$$k^2 = \frac{DG_c}{\pi \cdot r_g^2 E_g(r_m - r_g)} \quad (2)$$

where, D is the width of the embedding slot, H is the height of the embedding slot, and H=D; $G_c$ is the shear modulus of colloid; $r_g$ is the radius of bare fiber; $E_g$ is the elastic modulus of fiber; $r_m-r_g$ is the thickness of colloid between fiber and matrix; and L is half of the adherence length of the FBG sensor;

when the adherence length of the FBG sensor is constant, the influence factor of a parameter k determines the average strain transmissibility of the FBG sensor, the parameter is determined with $\overline{\alpha}$ approaching 1 as the goal, and the size of the FBG sensor embedding slot is determined on the premises of actual processing precision and fiber packaging technology;

(2) determination of position of FBG sensor embedding slot determining the position of the FBG sensor embedding slot according to the critical adherence length of the FBG sensor and the single bolt connection joint surface pressure distribution theory, wherein the length of the FBG sensor embedding slot arranged in the selected position must reach the critical adherence length of the FBG sensor; according to the single bolt connection joint surface pressure distribution theory, the pressure on the joint surface along the radial direction of connected pieces meets the quartic curve distribution, and the joint surface pressure on the FBG sensor embedding slot is destroyed, but to ensure the integrity of quartic curve distribution information, the position of the FBG sensor embedding slot is restricted in combination with the critical adherence length of the FBG sensor and the single bolt connection joint surface pressure distribution theory;

the critical adherence length CAL of the FBG sensor is:

$$CAL=l_c=9.24/k \quad (3)$$

according to formula (3), calculating the critical adherence length of the FBG sensor, and determining the position of the FBG sensor embedding slot in combination with the requirements of the single bolt connection joint surface pressure distribution theory;

according to the determined size and position of the FBG sensor embedding slot, packaging the FBG sensor, thus obtaining the strain value of the bolt fastening joint surface;

(3) determination of joint surface contact pressure of FBG sensor measuring position on the basis of the single bolt connection joint surface pressure distribution theory, the joint surface contact pressure meets the quartic curve distribution along the radial direction, as shown in the following formula:

$$p_n(r)=c_4r^4+c_3r^3+c_2r^2+c_1r+c_0 \quad (4)$$

where, $c_i$, i=0, 1, . . . , 4 is an unknown parameter; and r is the distance from any point on the radius to the center of the bolt.

* * * * *